UNITED STATES PATENT OFFICE.

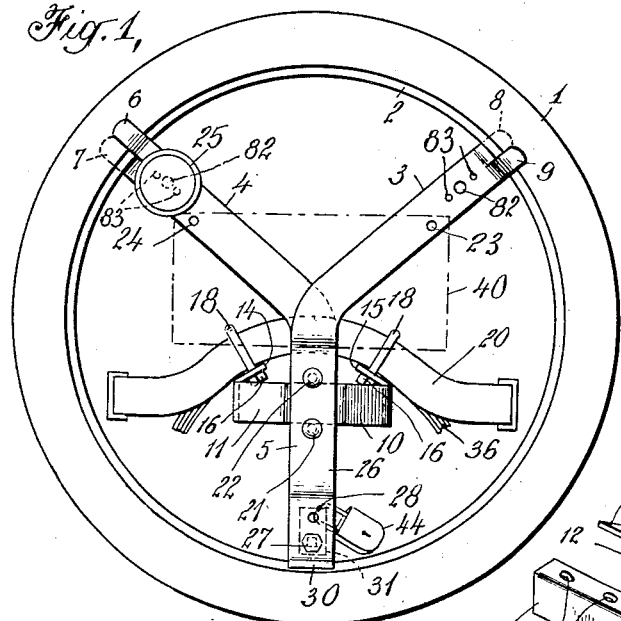

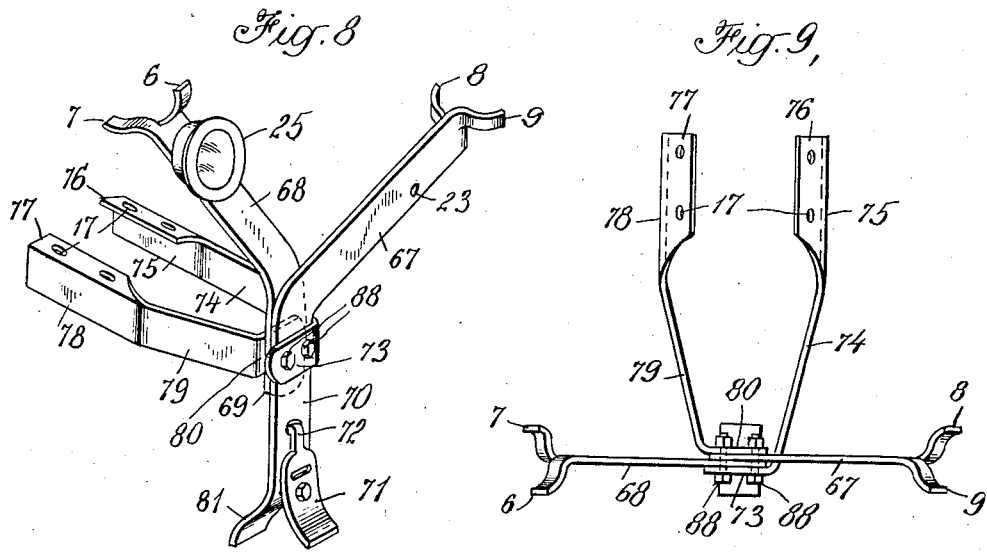
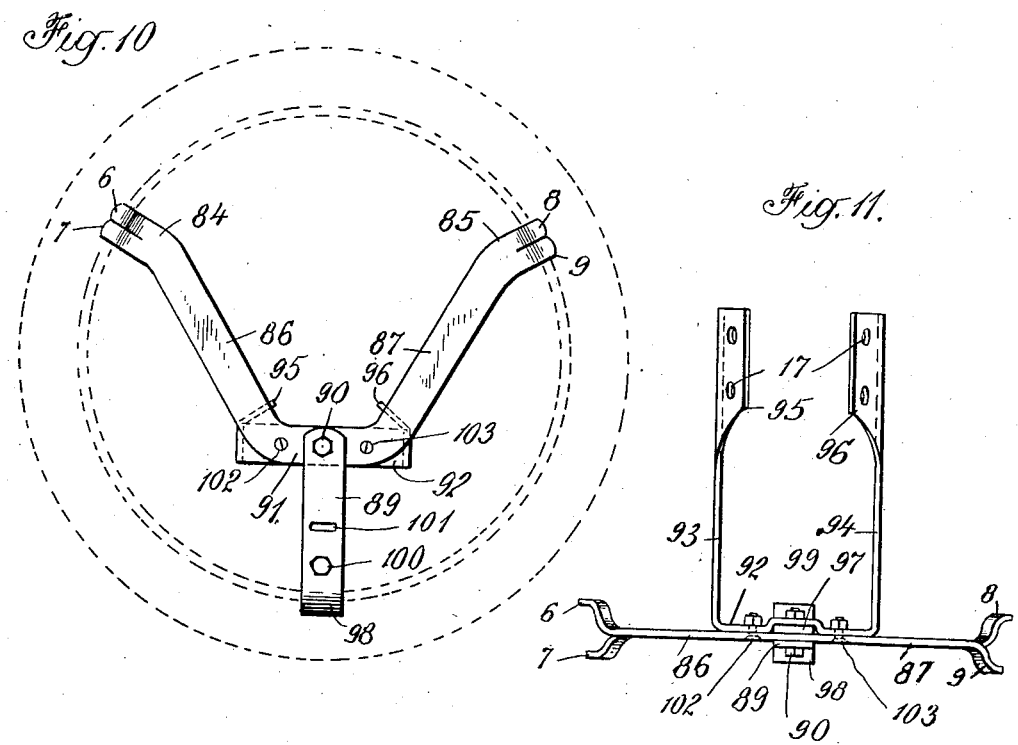

GEORGE ALBERT LYON, OF PHILADELPHIA, PENNSYLVANIA.

TIRE-HOLDER.

1,386,188.  Specification of Letters Patent.  Patented Aug. 2, 1921.

Application filed March 27, 1920. Serial No. 369,419.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Tire-Holders, of which the following is a specification, taken in connection with the accompanying drawings.

This invention relates to tire holders adapted to be used with Ford or similar automobiles and which may be substantially composed of a plurality of resilient flat metal strips and comprising attaching arms or members adapted to be connected to the rear spring or other convenient part of the automobile while overlapping junction portions located substantially centrally of the tire may be detachably connected to hold the parts in position. From the junction portions upwardly diverging tire supporting arms and depending tire holding arms may extend out toward the tire rim and may have alining or other suitable engaging members or portions to engage the tire rim and preferably forcibly hold it outward securely so as to prevent rattling under running conditions of the vehicle. Each of the tire supporting arms may in some cases be advantageously formed integral with one of the tire holding arms below and in this case the coöperating holding arms may be formed with separated adjusting portions which when allowed to spring outward may open sufficiently to allow the tire rim to be slipped between them so that the upper part of the rim may then be arranged on the fingers or contact portions of the tire supporting arms above. Suitable clamping or locking devices may be arranged to force these holding arms together so that wedging clamping portions which are preferably formed at their lower or free ends may grippingly engage the tire rim to insure tight engagement.

In the accompanying drawing showing in a somewhat diagrammatic way illustrative embodiments of this invention, Figure 1 is a rear view showing one form of the tire holder when secured to an automobile.

Fig. 2 is a side sectional view thereof.

Fig. 3 is a perspective view of the assembled but disconnected tire holder.

Fig. 4 is a separate view of the attaching arms thereof.

Fig. 5 is a perspective view of another form of tire holder in assembled disconnected position.

Fig. 6 is a side elevation thereof.

Fig. 7 shows another form of attaching arm.

Fig. 8 is a perspective view of another assembled disconnected tire holder.

Fig. 9 is a top view thereof.

Fig. 10 is a rear view showing still another arrangement; and

Fig. 11 is a plan view thereof.

The tire holder may comprise a number of flat resilient metal strips which preferably though not necessarily are formed of tempered spring steel strip, about an inch and a half or two inches wide and a quarter to three-eights of an inch thick giving good results. These strips may as indicated in Figs. 1 to 3 be advantageously bent and formed so that each tire supporting arm 3 and 4 is integral with the coöperating depending tire holding arm 26. In this way, if desired, each of these tire engaging arms may be stamped and bent out in similar dies and forms so that one of the arms may be turned into reverse position, thus giving somewhat separated offset junction portions adjacent the center of the tire while the lower parts of the tire holding arms, such as 26, diverge to form separated adjusting portions 43 which normally spring out into such dotted separated position as shown in Fig. 2 in which the tire rim may slip between these adjusting portions sufficiently to allow the upper part of the tire rim to be slipped over the tire engaging fingers or contact portions 6, 7, 8 and 9 which may be diversely bent split ends of the supporting arms. After the tire has been put in place the depending tire holding arms may be forced or clamped together in any suitable way as by one or more clamping bolts forcing their wedging, clamping ends 30 together, so as to have clamping engagement on the tire rim 2 so as to simultaneously force down the upper part of the tire 1 and tire rim 2 into secure, alining engagement with the fingers. A convenient arrangement of locking bolt is shown in Fig. 3 as comprising a polygonal head 27 and a polygonal enlarged shank portion 35 adapted to fit within either one of the square or other polygonal holes 29 which may be punched or formed at any convenient point in the lower ends of the tire holding arms. The threaded end of this bolt may thus pass through the farther hole 29 to engage the threaded hole 32 in a locking or other washer 31 which may, if desired, have a sufficient extension so that the locking hole or aperture 33 therein may be brought substantially into line with the corresponding hole 28, this part of the nut being bent outward sufficiently to clear the flaring end 30 of the holding arm if the bolt hole is located adjacent thereto. This arrangement makes it possible to pass a padlock such as 44 through the two holes 33, 28, so as to prevent rotation of the nut 31 until the padlock is unlocked, rotation of the bolt being prevented by its polygonal enlarged shank 35 which cannot rotate within the hole 29.

A convenient form of attaching device to coöperate with these arms is shown in Fig. 4 as comprising a junction portion or junction socket 39 preferably of such width as to have alining engagement with the edge portions of one of the other junction members. This junction portion may fit between the other junction members and be clamped thereto by any suitable means as the U-bolt or other junction bolts 21, 22 preferably having nuts 37, 38 on the inner side of the junction socket so that all of the junction portions may be tightly and securely united. The attaching arms may have diverging portions 10, 11 adjacent the junction socket, and if desired, the ends 12, 13 of these attaching arms may be formed with integral attaching flanges or bracket portions 14, 15 of such shape and angular arrangement as to fit beneath the transverse rear spring 36 of the Ford automobile and be secured thereto by the spring U-bolts 18 which may pass through holes 17 in these bracket portions beneath which the nuts 16 may be arranged. In this way the spring and attaching members are simultaneously secured to the frame channel 20 so that the tire holder is securely connected to the automobile and the supporting arms held with additional firmness because of the relatively rigid character of the attaching arms due to their vertically rigid arrangement, and if desired, the attaching arms may be formed with additional holes, such as 23, 24, through which bolts may pass so as to secure a license plate 40 to these arms as indicated in dotted lines in Fig. 1. Additional holes 82, 83 may be stamped in one or both of these tire supporting arms so that a tail light 25 may be permanently connected thereto adjacent the license bracket or the license holes in the arms. In this way the tire holder with practically no added expense or weight serves as the license and lamp bracket which of course is highly desirable in many cases.

Figs. 5 and 6 show another arrangement in which only one of the tire supporting arms 48 is formed with an integral depending tire holding arm or portion which may have a flaring wedging lower end 60, the other supporting arm 45 which may similarly be formed with diverging integral fingers, such as 8, 9, may have a closely engaging junction portion 46 coöperating with the junction portion 47 of the other arm, while an independently movable retainer arm 59 may be formed with a wedging end portion 61 corresponding to the wedging end 60 so as to clamp a tire rim between them. This retainer arm may be movably connected to the other junction portions in any suitable way as by suitable bolts or rivets and as indicated a junction U-bolt 55 may pass through these junction portions and preferably have its lower shank 56 fitting somewhat loosely within an aperture in the retainer arm so as to allow pivotal movement of the arm about this bolt shank when the securing bolt 57 is released. Locking apertures 58 may be formed in these arms, if desired, so as to lock them in tire engaging position by means of a padlock, for instance. The attaching arms may in this instance be formed with a junction socket or portion 49 having more or less alining action on the edges of one of the other junction portions and diverging or outwardly curving portions 50, 51 may merge into the attaching ends 52, 53 of these arms which may be bolted or secured to the vehicle spring or any other adjacent part, for which purpose bolt holes 54 may be formed therein. As shown in Figs. 5 and 6 the attaching arms may be formed with substantially right angled junction portions for use with sedan car or runabout Ford models, while for touring cars it is more desirable to form the attaching arms as shown in Fig. 7 in which each arm 64 is formed with a depending angularly arranged junction portion or socket 66, the adjacent portion 65 of the arm being somewhat bent downward, if desired.

Figs. 8 and 9 show a somewhat similar arrangement of tire supporting and holding arms. The supporting arm 68 may be formed with a junction portion 69 bolted or otherwise clamped to the junction portion 70 of the coöperating supporting arm 67 formed with similar tire supporting fingers or portions. The lower end of either one of these arms may be formed with a wedging portion, such as 81, and a separate retainer arm, such as 71, may have a similarly wedging or flaring lower portion to engage and clamp the tire rim when the securing bolt indicated is screwed home. This retainer arm may in some cases have a bent end or connecting tip 72 extending as indicated through a connecting aperture adjacent the junction portion 70 of the depending holding arm so as to prevent undesirable movement of this part of the retainer, while allowing it to swing about this point when the owner has released the securing bolt and the padlock which may be used, if desired. In this instance the attaching arms are formed of two separate resilient or other strips having separate junction portions 73, 80 as indicated in Fig. 9, the attaching arm 75 having, if desired, an attaching flange or bracket 76 in which apertures 17 may be formed while the connected portion 75 of the attaching arm may be bent inward toward the junction portion 73. The other attaching arm 78 may have a similar flange 77 and be provided with the bent portion 79 and junction portion 80, all of these junction portions being bolted or clamped in overlapping position as by the junction bolts 88 indicated.

Figs. 10 and 11 show another illustrative arrangement which may comprise a duplex tire supporting arm 86, 87 having the intermediate bent junction portion 91 which may extend in a horizontal direction in such cases. These upwardly extending and diverging supporting arms are thus formed of one strip of spring steel or other resilient material and preferably have their ends 84, 85 bent outward into more nearly radial position before being split and spread to form the rim engaging portions or fingers 6, 7, 8 and 9. The attaching arms may in this case be formed of a single strip of resilient or other material comprising, if desired, the integral attaching flanges or bracket portions 95, 96 from which the attaching arms 93, 94 may extend substantially parallel toward the horizontal junction portion 92 which may more or less overlap the junction portion 91 of the supporting arms. It is advantageous in some cases, however, to form one of these junction portions with an offset mid-portion as indicated in Fig. 11 so as to extend around one of the depending tire holding arms, such as 97, so that it may be substantially rigidly supported and undesirable lateral movement thus prevented. A coöperating retainer arm such as 89 may be swingingly mounted as by the junction bolt 90 passing through this central part of the junction portions so that when swung down into the vertical position indicated this retainer arm may be clamped as by the securing bolt 100 against the other arm to lock a tire rim between the same, a locking slot 101 being arranged in both of these depending arms to lock them together. The retainer arm may of course be swung out of this locking position when releasing the tire and for this purpose one or both of the other locking bolts may be formed with a countersunk flat head such as 103 to allow the retainer arm to pass the same while the other junction bolt 102 may be of any desired form in most cases.

This invention has been described in connection with a number of illustrative forms, proportions, parts, materials, arrangements and sizes, to the details of which disclosure the invention is not of course to be limited, since what is claimed as new and what is desired to be secured by Letters Patent is set forth in the appended claims.

1. In automobile tire holders, a pair of coöperating resilient strip supporting arms having separated upper ends adapted to support a tire rim and having junction portions and depending holding arms having wedging clamping ends and separated adjusting portions adjacent said ends, a holding bolt adjustably forcing said clamping ends together to grip the lower part of a tire rim and hold the same against said supporting arms, a coöperating resilient strip attaching member having a junction portion adapted to be interposed between said junction portions and a junction U-bolt passing through said junction portions to detachably connect the same, said attaching member having diverging substantially vertically rigid attaching arms and inwardly projecting integral attaching flanges adapted to coöperate with the transverse rear spring of an automobile and be engaged and clamped thereto by the spring U-bolts.

2. In automobile tire holders, a pair of coöperating resilient strip supporting arms having separated upper ends adapted to support a tire rim and having junction portions and depending holding arms having wedging clamping ends, a coöperating resilient strip attaching member having a junction portion adapted to be interposed between said junction portions and a junction bolt passing through said junction portions to detachably connect the same, said attaching member having diverging substantially vertically rigid attaching arms and inwardly projecting integral attaching flanges adapted to coöperate with the transverse rear spring of an automobile and be engaged and clamped thereto by the spring U-bolts.

3. In automobile tire holders, coöperating resilient strip supporting arms having separated upper ends adapted to support a tire rim and having overlapping junction portions and depending holding arms having clamping ends and means for adjustably forcing said clamping ends together to grip the lower part of a tire rim and hold the same against said supporting arms, a one-piece coöperating resilient strip attaching member having a narrow alining junction socket adapted to coöperate with the edges of one of said junction portions and a junction bolt connecting said junction portions thereto, said attaching member having separated substantially vertically rigid attaching arms adapted to coöperate with the transverse rear spring of an automobile and be clamped thereto.

4. In automobile tire holders, coöperating supporting arms having separated upper ends adapted to support a tire rim and having overlapping junction portions and holding arms, a one-piece coöperating resilient strip attaching member having a narrow alining junction socket adapted to coöperate with said junction portions and a junction bolt connecting said junction portions thereto, said attaching member having separated substantially vertically rigid attaching arms adapted to coöperate with the transverse rear spring of an automobile and be clamped thereto.

5. In automobile tire holders, coöperating supporting arms having separated upper ends adapted to support a tire rim and having overlapping junction portions and holding arms, a one-piece resilient strip attaching member adapted to coöperate with said junction portions and a junction bolt connecting said junction portions thereto, said attaching member having separated attaching arms adapted to coöperate with an automobile and be clamped thereto.

6. In automobile tire holders, resilient strip supporting and holding arms having junction portions and adapted to engage and be clamped against a tire rim at circumferentially separated points and a coöperating resilient strip attaching member adapted to be secured to an automobile spring to support said arms therefrom and having junction portions adapted to engage the junction portions of said arms and have alining action in connection with the edges thereof and U-bolt junction means to detachably and securely hold together said junction portions.

7. In automobile tire holders, resilient strip supporting and holding arms having substantially flat junction portions and adapted to engage a tire rim at circumferentially separated points and a coöperating resilient strip attaching member adapted to be secured to an automobile to support said arms therefrom and having junction portions adapted to coöperate with the junction portions of said arms and be detachably bolted thereto and have alining action in connection with the edges thereof.

GEORGE ALBERT LYON.